A. F. JENKINS.
ACETYLENE GENERATOR AND TORCH.
APPLICATION FILED FEB. 18, 1910.
1,116,821.
Patented Nov. 10, 1914.
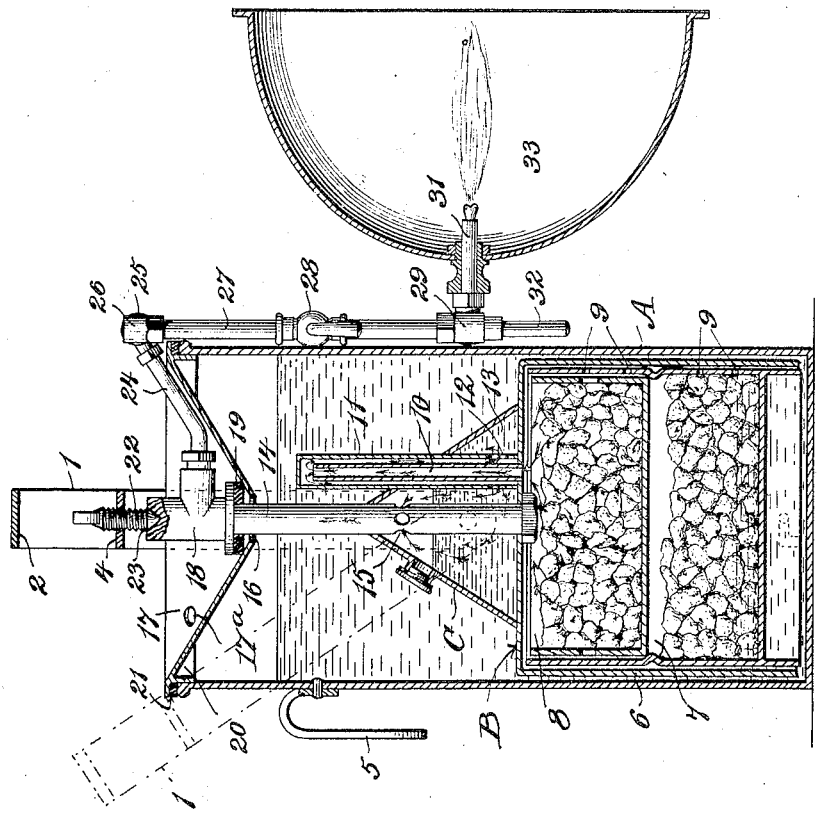
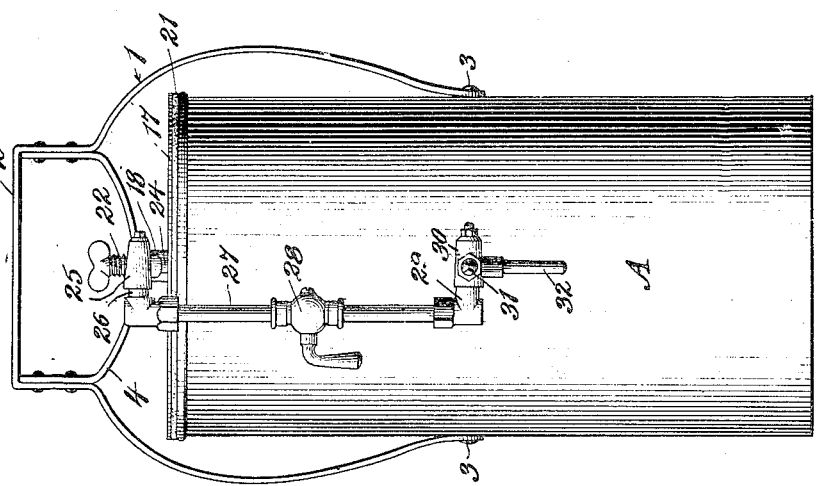
Alexander F. Jenkins.
Inventor
Witnesses
Susan Plessner Pollock
V. A. P. Bradway
By Chattin Bradway,
Attorney

UNITED STATES PATENT OFFICE.

ALEXANDER F. JENKINS, OF BALTIMORE, MARYLAND, ASSIGNOR TO THE ALEXANDER MILBURN COMPANY, OF BALTIMORE, MARYLAND, A CORPORATION OF MARYLAND.

ACETYLENE GENERATOR AND TORCH.

1,116,821.

Specification of Letters Patent.

Patented Nov. 10, 1914.

Application filed February 18, 1910. Serial No. 544,624.

*To all whom it may concern:*

Be it known that I, ALEXANDER F. JENKINS, a subject of the King of Great Britain, residing in Baltimore city and State of Maryland, have invented certain new and useful Improvements in Acetylene Generators and Torches, of which the following is a specification.

This invention relates to acetylene generators and torches of the portable type adapted to be carried by firemen in rescue work, the device being so designed that it can be conveniently carried by the fireman in making his way through dark rooms and passages, especially in the case of dwellings and other buildings burning at night.

The invention has for one of its objects to provide a device of this character which is of comparatively simple and inexpensive construction, of light weight, reliable and efficient in use, and so designed as to require very little attention in its use.

Another object of the invention is the provision of a novel tank construction with means for holding the generator in place by the bail used for carrying the device, the bail also serving to hold the cover of the tank seated so that the device can be carried about without danger of water splashing out.

Another object is to provide a novel form of cover for closing the tank and at the same time serving as a funnel for facilitating the filling of the tank with water.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a front view of the apparatus. Fig. 2 is a vertical section thereof.

Similar reference characters are employed to designate corresponding parts in the views.

Referring to the drawing, A designates a water-containing tank that is open at its top to permit of the insertion and removal of the generator designated generally by B. The tank is provided with a bail 1 consisting of side members connected by a top cross piece 2 that forms a handle and hinged at their lower ends 3 on the tank at diametrically opposite points, and secured to the side members, at a point under the handle 2, is a cross bar 4 spaced from the handle so that the fingers can be passed between them in taking hold of the handle. On the rear side of the tank is a hook 5, whereby the device can be attached to a support when the user does not wish to carry it.

The generator B consists of a cylinder or bell 6 slightly smaller in diameter than the tank so as to be submerged in the water in the latter. Within the bell is a drum or cylinder 7 closed at its bottom and open at its top, and surrounding this drum is a water space that communicates with the water space around the bell. In the drum is a carbid holder such as a tray 8 that occupies the upper half of the drum, while the lower half contains carbid. In the wall of the drum are spaced apertures 9 arranged at successively higher levels for admitting water to the carbid first in the bottom of the drum and finally in the tray. Formed on the top of the bell is a washer C through which the gas passes on leaving the generator. Opening into the top of the generator is a pipe 10 which rises out of the wall of the washer to a suitable height, and surrounding and inclosing this pipe is another pipe 11 which has its lower end fixed in the washer and provided with openings 12 through which the gas discharges into the water 13 for removing the impurities. Arranged centrally in the washer is a gas outlet pipe 14 that has apertures 15 communicating with the gas space in the top of the washer. This pipe 14 continues to the top of the tank and extends through an opening 16 in the cover 17 of the tank, where the pipe is provided with an elbow 18, there being a washer or gasket 19 disposed between the bottom of the coupling 18 and cover 17 to seal the opening 16. The cover has an internal flange 20 that fits within the tank and under the cover is a packing ring 21 that forms a water seal.

In the cover 17 is an aperture 17$^a$ so that the pressure in the interior of the tank will always be the same as the air pressure outside.

The cover is clamped in closed position and the generator held down by the bail of the tank, there being a screw 22 on the cross bar 4 of the bail which engages in a socket or seat 23 provided on the top of the coupling 18. By tightening the screw, the pipe 14, together with the generator, is forced downwardly and as the result, the packings 19 and 21 are compressed so that leakage of water is prevented should the apparatus be accidentally turned over. The cover 17 is preferably dished inwardly so as to form a funnel, whereby the water can be readily supplied to the tank after the generator has been inserted, it being merely necessary to loosen the screw 22 and raise the generator by lifting the coupling 18 to remove the washer from the cover 17, and by doing this the water poured into the funnel-shaped cover is free to drain through the opening 16 into the tank. Since the bail is pivoted on the tank, it can be swung to one side to permit the cover, together with the generator, to be lifted out of the tank.

The gas-conducting pipe at the outside of the tank is preferably made of hingedly connected sections, so that the flame can be moved to any desired position. Attached to the coupling 18 is a short fixed pipe section 24 that terminates at the edge of the tank and is provided with a socket coupling 25 in which is mounted a pivot coupling 26. Attached to this coupling 26 is a section 27 disposed vertically and having a controlling cock 28. On the extremity of the pipe section 27 is a pivot coupling 29 on which is arranged a socket coupling 30 that carries a burner jet 31 and also a handle 32 whereby the coupling 30 can be turned to throw the flame upwardly or downwardly in a vertical plane. On the burner tube 31 is supported a parabolic reflector 33 for concentrating the rays on any given point. The pipe section 27 can be swung about the coupling 25 as a center through one hundred and eighty degrees from a position in front of the tank to a position wholly above the latter, whereby the device can be set to suit different conditions. Furthermore, the generator and the whole gas conduit can be turned as a unit about the axis of the generator for directing the flame to different points in a horizontal plane, this movement being limited by the pipe section 24 striking the members of the bail, and this adjustment is desirable when the device is supported by the hook 5, and the flame is required to be directed on a given point to either side. The swinging section 27 is of such length that when it is in vertical pendant position, as shown, the reflector will be supported sufficiently above the floor as not to interfere with the tank resting flat on its bottom.

The structure disclosed herein but not claimed, such as the means for movably mounting the burner and reflector, and also the details of the outlet pipe, constitute the subject matter of a divisional application Ser. No. 732,719, filed Nov. 21, 1912.

From the foregoing description, taken in connection with the accompanying drawings, the advantages of the construction and operation of the invention will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim, is:—

1. The combination of a tank, a generator therein, a cover having an opening, a pipe extending through the cover from the generator, a packing between the cover and tank, a shoulder on the pipe, a packing between the shoulder and cover, a bail for the tank, and means acting between the bail and pipe for holding the packings compressed and for maintaining the generator submerged in the tank and the bail fixed with respect to the tank.

2. The combination of a tank, a generator therein, a washer carried by the generator, means for conducting gas from the generator to the washer, an outlet pipe connected with the washer and leading out of the tank and having a movable section disposed exterior to the tank, said generator together with the washer and outlet pipe being rotatable in the tank, and a bail on the tank operating through the outlet pipe to hold the generator and washer submerged.

3. The combination of a tank, a generator therein, a cover for the tank, a bail on the tank normally disposed over the cover, a pipe secured to the generator and extending through the cover, a coupling on the pipe, means on the bail for engaging the coupling to hold the generator submerged, a pipe section leading from the coupling to the side of the tank, and a swinging burner-carrying pipe section secured to the first-mentioned pipe section.

4. The combination of a tank, a generator therein, a funnel-shaped cover for the tank having a water-filling opening, an outlet pipe extending from the tank through the opening and terminating at the side of the tank, and a movable burner-carrying pipe section connected with the said pipe.

5. An acetylene generating apparatus including means for holding carbid, and a vessel for holding water to act on the carbid, the top of the vessel being reëntrant and having an opening at the bottom of its reëntrant portion to form a funnel through which water is poured into the vessel, and means for closing the opening of the funnel.

6. The combination of a tank for containing water at atmosphere pressure, a generator submerged in the tank and consisting of a gas-holding body, means within the body for holding a gas-generating material, a gas outlet pipe connected with the generator and removable with the latter from the tank, a bail for the tank and having a grip portion, and means below the grip portion of the bail for releasably engaging the pipe to hold the generator submerged.

7. The combination of a tank, a generator submerged in the tank and consisting of a gas-holding body, means within the body for holding a gas generating material, a cover for the tank, an outlet pipe connected with the generator and extending through the cover, a movable bail connected with the tank and having a grip portion, and means on the bail under the grip portion for engaging the pipe to hold the generator submerged and for preventing movement of the bail with respect to the tank.

8. The combination of a tank, a generator submerged in the tank, a gas outlet connected with the generator, a pivoted bail on the tank, and having a grip portion, a member on the bail and disposed under the grip portion and a screw on the said member of the bail for engaging the pipe to hold the generator down in the tank.

In testimony whereof I affix my signature in presence of two witnesses.

ALEXANDER F. JENKINS.

Witnesses:
E. DELAHAY,
A. THOMPSON.